United States Patent
Fang et al.

(10) Patent No.: US 12,077,679 B2
(45) Date of Patent: Sep. 3, 2024

(54) INTUMESCENT FIRE-RETARDANT COATING WITH ULTRA-HIGH CORROSION RESISTANCE AND PREPARATION METHOD THEREOF

(71) Applicants: FUJIAN SOUTH PEAK FIRE PREVENTION TECHNOLOGY CO., LTD., Quanzhou (CN); XIAMEN UNIVERSITY, Xiamen (CN)

(72) Inventors: Jianghai Fang, Quanzhou (CN); Lizong Dai, Quanzhou (CN); Qingliang Liu, Quanzhou (CN); Yansong Liu, Quanzhou (CN); Huanhuan Xu, Quanzhou (CN); Chun'e Guo, Quanzhou (CN)

(73) Assignees: FUJIAN SOUTH PEAK FIRE PREVENTION TECHNOLOGY CO., LTD., Quanzhou (CN); XIAMEN UNIVERSITY, Xiamen (CN)

( * ) Notice: Subject to any disclaimer, the term of this patent is extended or adjusted under 35 U.S.C. 154(b) by 415 days.

(21) Appl. No.: 17/456,499

(22) Filed: Nov. 24, 2021

(65) Prior Publication Data

US 2022/0177713 A1   Jun. 9, 2022

(30) Foreign Application Priority Data

Dec. 3, 2020 (CN) .......................... 202011407415.2

(51) Int. Cl.
| | |
|---|---|
| C09D 5/18 | (2006.01) |
| C09D 5/02 | (2006.01) |
| C09D 5/08 | (2006.01) |
| C09D 7/43 | (2018.01) |
| C09D 7/61 | (2018.01) |
| C09D 7/65 | (2018.01) |
| C09D 123/08 | (2006.01) |
| C09D 131/04 | (2006.01) |

(52) U.S. Cl.
CPC ............ *C09D 5/185* (2013.01); *C09D 5/022* (2013.01); *C09D 5/084* (2013.01); *C09D 7/43* (2018.01); *C09D 7/61* (2018.01); *C09D 7/65* (2018.01); *C09D 131/04* (2013.01)

(58) Field of Classification Search
None
See application file for complete search history.

(56) References Cited

FOREIGN PATENT DOCUMENTS

| | | | | |
|---|---|---|---|---|
| CN | 102604490 A | 7/2012 | | |
| CN | 102838907 A | 12/2012 | | |
| CN | 105694620 A | 6/2016 | | |
| CN | 105885580 A | * 8/2016 | ........... | C09D 133/00 |
| CN | 109517470 A | * 3/2019 | ........... | C09D 131/04 |
| CN | 109929345 A | 6/2019 | | |
| CN | 111484732 A | 8/2020 | | |

OTHER PUBLICATIONS

Machine translation of CN-105885580-A (no date).*
Machine translation of CN-109517470-A (no date).*
First Office Action in corresponding Chinese patent application No. 202011407415.2 dated Aug. 4, 2021.

* cited by examiner

*Primary Examiner* — Michael J Feely
(74) *Attorney, Agent, or Firm* — Westman, Champlin & Koehler, P.A.

(57) ABSTRACT

Disclosed are an intumescent fire-retardant coating with ultra-high corrosion resistance and a preparation method thereof. The fire-retardant coating is composed by water, wetting and dispersing agent, defoaming agent, composite carbon-forming catalyst, composite blowing agent, pentaerythritol, titanium dioxide, $Mg(OH)_2$, mica powder, kaolin, anti-rust pigment, aluminum tripolyphosphate, VAE emulsion, freeze-thaw agent, film-forming aid, and thickener. On the basis of the existing fire-retardant coatings, the present disclosure adds a series of anti-corrosion, heat insulation fillers and salt spray resistance additives to achieve a certain salt spray resistance effect. The fire-retardant coating of the present disclosure has both fire-retardant and anticorrosive functions, does not contain organic solvents, is low in price, has high construction tolerance, and has broad application prospects in the field of intumescent fire-retardant coatings.

8 Claims, No Drawings

INTUMESCENT FIRE-RETARDANT COATING WITH ULTRA-HIGH CORROSION RESISTANCE AND PREPARATION METHOD THEREOF

CROSS REFERENCE TO RELATED APPLICATION

This patent application claims the benefit and priority of Chinese Patent Application No. 202011407415.2 filed on Dec. 3, 2020, the disclosure of which is incorporated by reference herein in its entirety as part of the present application.

TECHNICAL FIELD

The present disclosure belongs to the field of intumescent fire-retardant coatings, and particularly relates to an intumescent fire-retardant coating with ultra-high corrosion resistance and a preparation method thereof.

BACKGROUND ART

With the progress and development of society, high-rise buildings have sprung up like mushrooms. Steel structure has been widely used in modern buildings due to its light weight, strong bearing capacity, short construction period, and strong resistance to deformation. Although non-flammable, its mechanical properties deteriorate with increasing temperature. When the temperature is higher than 450° C., the strength of the steel structure drops rapidly. When the temperature exceeds 600° C., the steel loses its bearing capacity, resulting in the collapse of the rigid structure building. The fire resistance limit of steel without any protection is generally about 15 min. For example, on Sep. 11, 2001, the World Trade Center in New York was hit by a terrorist attack. The main building collapsed only 30 min later, causing 2,797 deaths and a loss of 36 billion U.S. dollars. On Feb. 9, 2009, a fire in the "Cultural Center Building" project on the north side of CCTV's new site resulted in the death of one firefighter, six injuries and a direct property loss of 160 million yuan; On Feb. 3, 2011, the fire of the Shenyang Dynasty Wanxin Hotel caused a direct loss of 93.84 million yuan.

The application of water-based intumescent fire-retardant coatings in fire-retardancy of steel structure is becoming more and more extensive, and people are paying more and more attention. Due to its effective passive fire-retardant capability, intumescent fire-retardant coatings can be used on industrial and commercial steel structures to reduce the rate of temperature rise of steel structures during a fire. Intumescent fire-retardant coatings provide decorative surface treatment to delay the time when the steel reaches the critical temperature and loses its load-bearing capacity. This provides vital extra time for the evacuation of people in the building and an opportunity for firefighters to control the fire. The classic intumescent fire-retardant coating contains three basic components: acid source, carbon source and gas source. The intumescent coating expands under the action of heat to form a foamed carbon layer, which acts as a thermal barrier and slows down the heat and mass transfer between the condensed phase and the gas phase.

Metal corrosion is also a problem that cannot be ignored in steel structure buildings. Metal corrosion brings a lot of inconvenience to production and life, and causes huge economic losses. According to statistics, the world's annual direct economic loss caused by metal corrosion is about 700 billion US dollars, which is 6 times the total loss caused by natural disasters such as earthquakes, floods, and typhoons. China is a big country in steel production. In 2019, steel production was 996 million tons, accounting for about 54% of the world's total. Losses due to metal corrosion in China accounted for 4% of GDP, and the amount of steel scrap due to corrosion accounted for about 25-30% of steel output that year. In addition, metal corrosion may also cause environmental pollution. On Aug. 1, 2007, a bridge across the Mississippi River in Minnesota, USA, collapsed due to metal corrosion, which caused 6 deaths.

Although intumescent fire-retardant coatings can protect steel structures to a certain extent, they cannot provide sufficient corrosion protection when used alone. At present, the most commonly used anti-corrosion treatment of steel structure is to first apply a layer of anti-corrosion primer on the steel structure, and then apply a layer of intumescent fire-retardant coating. This not only makes the construction more troublesome, increases labor costs and material costs, and extends the construction period, but also needs to consider the compatibility of the primer and the fire-retardant coating and the adhesion between layers.

The purpose of the present disclosure is to provide an intumescent fire-retardant coating with ultra-high corrosion resistance and a preparation method thereof. It does not contain organic solvents, through the synergy of P-N-C, it can be expanded to form a honeycomb carbonized layer, adding a certain amount of heat insulation and anti-corrosion fillers can make it have the effect of heat insulation and fire-retardant in the event of a fire, and it also plays a role in anti-corrosion and salt spray resistance under daily conditions.

SUMMARY

The purpose of the present disclosure is to overcome the shortcomings of the prior art, provide an intumescent fire-retardant coating with ultra-high corrosion resistance and a preparation method thereof, and solve the problems of poor anti-corrosion and salt spray resistance of steel structure intumescent fire-retardant coatings, incompatibility between primer and anti-corrosion intermediate coating, and interlayer adhesion in the above background technology.

One of the technical schemes adopted by the present disclosure to solve the technical problems is to provide an intumescent fire-retardant coating with ultra-high corrosion resistance, wherein the mass ratio of each component is as follows:

Water 13-20;
Wetting and dispersing agent 0.3-0.6;
Defoaming agent 0.2-0.5;
Composite carbon-forming catalyst 12-20;
Composite blowing agent 6-10;
Pentaerythritol 6-10;
Titanium dioxide 3-6;
$Mg(OH)_2$ 4-8;
Mica powder 3-6;
Kaolin 3-7;
Anti-rust pigment 3-7;
Aluminum tripolyphosphate 4-7;
VAE emulsion 11-21;
Freeze-thaw agent 0.6-0.8;
Film-forming aid 1.0-1.8;
Thickener 0.2-0.5;

Wherein, the wetting and dispersing agent is an ammonium polycarboxylate salt dispersing agent, which can effectively improve the water resistance of the paint film, and improve the storage stability and leveling properties of the coating;

The defoaming agent is a silicone defoaming agent; the freeze-thaw agent is ethylene glycol; the film-forming aid is an alcohol ester 12; and the thickener is an associative polyurethane thickener;

The composite carbon-forming catalyst is a self-made ammonium polyphosphate/calcium phytate composite material, and the mass ratio of the ammonium polyphosphate and calcium phytate is 2:1; the composite blowing agent is a self-made melamine/chlorinated paraffin composite material, and the mass ratio of melamine to chlorinated paraffin is 2:1; and the pentaerythritol is used as a carbonizing agent. The fire-retardant mechanism of the fire retardant composed of the composite carbon-forming catalyst, the composite blowing agent and the carbonizing agent is as follows: the addition of calcium phytate promotes the premature decomposition of ammonium polyphosphate, and enhances its ability to catalyze carbon formation of pentaerythritol. In addition, calcium phytate can act as an acid source and carbon source to improve the bond strength of the carbon layer. The introduction of chlorinated paraffin can decompose and generate gas at the initial stage of fire, and start to foam, thereby protecting the coating. When used in conjunction with melamine, it can form gradient foaming and secondary carbon-forming effects, enhance the thickness of the carbon layer, and improve the fire-retardant effect.

The titanium dioxide is rutile titanium dioxide, which has high covering power and strong coloring power, can increase the mechanical strength and adhesion of the paint film, prevent the penetration of ultraviolet rays and moisture, and prolong the life of the film;

The kaolin is calcined kaolin; the mica powder is sericite with a two-dimensional flake structure, which is waterproof and impermeable, acid and alkali resistant, and high temperature resistant, and can improve the heat resistance and corrosion resistance of the coating;

The anti-rust pigment is zinc phosphate, and its molecular formula is $Zn_3(PO_4)_2 \cdot nH_2O$. The anti-rust mechanism of zinc phosphate is as follows: $Zn^{2+}$ and PO in the zinc phosphate can react with metal to form a metal-Zn—$P_2O_5$ phosphating film, which will passivate the surface of the metal substrate and generate a phosphating compound with a molecule similar to $Zn_2Fe(PO_4)_2 \cdot nH_2O$;

The aluminum tripolyphosphate has a sheet-like structure, and its structural formula is as follows:

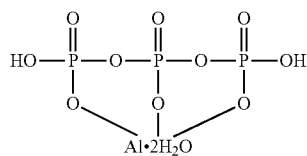

The anti-corrosion mechanism of aluminum tripolyphosphate is as follows: aluminum tripolyphosphate in water will dissociate tripolyphosphate ions with super complexing power, and can complex with $Fe^{2+}$ and $Fe^{3+}$ generated by the penetration of corrosive media to the bottom of the steel to form iron complex ions, thereby slowing down the corrosion of steel. At the same time, the produced iron complex ions have strong adsorption and can form a dense passivation film on the surface of the steel, thereby preventing further corrosion of the steel; In addition, phosphoric acid, which is decomposed by aluminum tripolyphosphate when heated, is used as a catalytic carbon-forming agent (acid source), which is dehydrated into carbon;

The VAE emulsion is a vinyl acetate-ethylene copolymer emulsion, and the content of vinyl acetate is more than 70%;

The freeze-thaw agent is ethylene glycol; the film-forming aid is alcohol ester 12;

The second technical scheme adopted by the present disclosure to solve the technical problem is to provide a method for preparing the intumescent fire-retardant coating with ultra-high corrosion resistance described in above technical scheme, wherein, comprising the following steps:
(1) Adding 13-20% of water, 0.3-0.6% of wetting and dispersing agent, and 0.2-0.5% of defoaming agent to a disperser and stirring at a rotation speed of 300-400 r/min for 3-5 min;
(2) Adding 12-20% of composite carbon-forming catalyst, 6-10% of composite blowing agent, 6-10% of pentaerythritol, 3-6% of titanium dioxide, 4-8% of $Mg(OH)_2$, 3-6% of mica powder, 3-7% of kaolin, 3-7% of anti-rust pigment, 4-7% of aluminum tripolyphosphate in sequence at a rotation speed of 400-900 r/min, adjusting the rotation speed to 1800-2000 r/min, and dispersing for 45-60 min;
(3) Adding 11-21% of VAE emulsion, 0.6-0.8% of freeze-thaw agent, 1.0-1.8% of film-forming aid and 0.2-0.5% of thickener at a rotation speed of 700-900 r/min.

The beneficial effects of the present disclosure:
(1) A certain amount of filler zinc phosphate and aluminum tripolyphosphate are added in the present disclosure. The $Zn^{2+}$ and $PO^{4-}$ in the zinc phosphate can react with the metal to form a metal-Zn—$P_2O_5$ phosphating film, which makes the surface of the metal substrate passivate. Aluminum tripolyphosphate dissociates in water to form tripolyphosphate ions with super complexing power, which can complex with $Fe^{2+}$ and $Fe^{3+}$ to form iron complex ions, thereby slowing down the corrosion of steel; at the same time, iron complex ions have strong adsorption and can form a dense passivation film on the surface of the steel, thereby preventing further corrosion of the steel. The addition of zinc phosphate and aluminum tripolyphosphate increases the fire and heat insulation effect, and at the same time makes the film have a certain function of anti-corrosion. The construction of the anticorrosive primer is reduced, and the construction cost is reduced to a certain extent.
(2) The present disclosure provides a fire retardant composed of a composite carbon-forming catalyst, a composite blowing agent and a carbonizing agent. The addition of calcium phytate promotes the premature decomposition of ammonium polyphosphate and enhances its ability to catalyze carbon formation of pentaerythritol. In addition, calcium phytate can act as an acid source and carbon source to improve the bond strength of the carbon layer. The introduction of chlorinated paraffin can decompose and generate gas at an early stage, and foams to protect the coating. It can be used in conjunction with melamine to form a gradient foaming and secondary carbon-forming effect, enhance the thickness of the carbon layer, and improve the fire protection effect. Therefore, the composite fire retardant can foam uniformly and densely and the carbon layer has good strength. The foaming ability is 1.5 times that of the classic system. It can replace the traditional three types (e.g. ammonium polyphosphate, melamine and pentaerythritol). Under the same expansion ratio, the addition amount is about two-thirds of the classic system, which can greatly reduce the addition amount of fire retardants, thereby reducing the cost of coatings.

(3) A certain amount of sericite is added in the present disclosure. Sericite is a two-dimensional flake structure with a high diameter-thickness ratio, it can be arranged horizontally in the film, perpendicular to the direction in which corrosive substances penetrate the film, thereby delaying the penetration of corrosive substances and increasing the heat insulation and corrosion resistance of the film to a certain extent.

(4) A certain amount of titanium dioxide is added in the present disclosure, which improves the strength of the carbonized layer while improving the paint film coverage;

(5) A certain amount of $Mg(OH)_2$ is added in the present disclosure, $Mg(OH)_2$ decomposes when heated (340-490° C.), absorbs the surface temperature of the burning material, and at the same time releases a large amount of water to dilute the oxygen concentration on the surface of the burning material, thereby achieving a better heat insulation and fire-retardant effect.

DETAILED DESCRIPTION OF THE EMBODIMENTS

Example 1

An intumescent fire-retardant coating with ultra-high corrosion resistance, which was prepared from the following raw materials according to the following mass ratios through the following steps:

(1) 18.7% of water, 0.5% of wetting and dispersing agent, and 0.3% of defoaming agent were added to a disperser and stirred at a speed of 300-400 r/min for 3-5 min;

(2) 12% of composite carbon-forming catalyst, 6% of composite blowing agent, 6% of pentaerythritol, 5% of titanium dioxide, 8% of $Mg(OH)_2$, 5% of mica powder, 6% of kaolin, 3% of anti-rust pigment, 6% of aluminum tripolyphosphate were added in sequence at a speed of 400-900 r/min, then the speed was adjusted to 1800-2000 r/min, and the components were dispersed for 45-60 min;

(3) 20% of VAE emulsion, 0.7% of freeze-thaw agent, 1.5% of film-forming aid and 0.3% of thickener were added at a speed of 700-900 r/min.

Example 2

An intumescent fire-retardant coating with ultra-high corrosion resistance, which was prepared from the following raw materials according to the following mass ratios through the following steps:

(1) 18.7% of water, 0.5% of wetting and dispersing agent, and 0.3% of defoaming agent were added to a disperser and stirred at a speed of 300-400 r/min for 3-5 min;

(2) 16% of composite carbon-forming catalyst, 7% of composite blowing agent, 7% of pentaerythritol, 5% of titanium dioxide, 7% of $Mg(OH)_2$, 4% of mica powder, 4% of kaolin, 3% of anti-rust pigment, 5% of aluminum tripolyphosphate were added in sequence at a speed of 400-900 r/min, then the speed was adjusted to 1800-2000 r/min, and the components were dispersed for 45-60 min;

(3) 20% of VAE emulsion, 0.7% of freeze-thaw agent, 1.5% of film-forming aid and 0.3% of thickener were added at a speed of 700-900 r/min.

Example 3

An intumescent fire-retardant coating with ultra-high corrosion resistance, which was prepared from the following raw materials according to the following mass ratios through the following steps:

(1) 18% of water, 0.5% of wetting and dispersing agent, and 0.3% of defoaming agent were added to a disperser and stirred at a speed of 300-400 r/min for 3-5 min;

(2) 18% of composite carbon-forming catalyst, 9% of composite blowing agent, 8% of pentaerythritol, 5% of titanium dioxide, 5% of $Mg(OH)_2$, 4% of mica powder, 3% of kaolin, 3% of anti-rust pigment, 5% of aluminum tripolyphosphate were added in sequence at a speed of 400-900 r/min, then the speed was adjusted to 1800-2000 r/min, and the components were dispersed for 45-60 min;

(3) 19% of VAE emulsion, 0.7% of freeze-thaw agent, 1.2% of film-forming aid and 0.3% of thickener were added at a speed of 700-900 r/min.

Example 4

An intumescent fire-retardant coating with ultra-high corrosion resistance, which was prepared from the following raw materials according to the following mass ratios through the following steps:

(1) 17% of water, 0.5% of wetting and dispersing agent, and 0.3% of defoaming agent were added to a disperser and stirred at a speed of 300-400 r/min for 3-5 min;

(2) 18% of composite carbon-forming catalyst, 9% of composite blowing agent, 8% of pentaerythritol, 5% of titanium dioxide, 5% of $Mg(OH)_2$, 4% of mica powder, 3% of kaolin, 4% of anti-rust pigment, 5% of aluminum tripolyphosphate were added in sequence at a speed of 400-900 r/min, then the speed was adjusted to 1800-2000 r/min, and the components were dispersed for 45-60 min;

(3) 19% of VAE emulsion, 0.7% of freeze-thaw agent, 1.2% of film-forming aid and 0.3% of thickener were added at a speed of 700-900 r/min.

Example 5

An intumescent fire-retardant coating with ultra-high corrosion resistance, which was prepared from the following raw materials according to the following mass ratios through the following steps:

(1) 16% of water, 0.5% of wetting and dispersing agent, and 0.3% of defoaming agent were added to a disperser and stirred at a speed of 300-400 r/min for 3-5 min;

(2) 18% of composite carbon-forming catalyst, 9% of composite blowing agent, 8% of pentaerythritol, 5% of titanium dioxide, 5% of $Mg(OH)_2$, 4% of mica powder, 3% of kaolin, 5% of anti-rust pigment, 5% of aluminum tripolyphosphate were added in sequence at a speed of 400-900 r/min, then the speed was adjusted to 1800-2000 r/min, and the components were dispersed for 45-60 min;

(3) 19% of VAE emulsion, 0.7% of freeze-thaw agent, 1.2% of film-forming aid and 0.3% of thickener were added at a speed of 700-900 r/min.

Example 6

An intumescent fire-retardant coating with ultra-high corrosion resistance, which was prepared from the following raw materials according to the following mass ratios through the following steps:
(1) 15% of water, 0.5% of wetting and dispersing agent, and 0.3% of defoaming agent were added to a disperser and stirred at a speed of 300-400 r/min for 3-5 min;
(2) 18% of composite carbon-forming catalyst, 9% of composite blowing agent, 8% of pentaerythritol, 5% of titanium dioxide, 5% of $Mg(OH)_2$, 4% of mica powder, 3% of kaolin, 6% of anti-rust pigment, 5% of aluminum tripolyphosphate were added in sequence at a speed of 400-900 r/min, then the speed was adjusted to 1800-2000 r/min, and the components were dispersed for 45-60 min;
(3) 19% of VAE emulsion, 0.7% of freeze-thaw agent, 1.2% of film-forming aid and 0.3% of thickener were added at a speed of 700-900 r/min.

Example 7

An intumescent fire-retardant coating with ultra-high corrosion resistance, which was prepared from the following raw materials according to the following mass ratios through the following steps:
(1) 15% of water, 0.5% of wetting and dispersing agent, and 0.3% of defoaming agent were added to a disperser and stirred at a speed of 300-400 r/min for 3-5 min;
(2) 18% of composite carbon-forming catalyst, 9% of composite blowing agent, 8% of pentaerythritol, 5% of titanium dioxide, 5% of $Mg(OH)_2$, 4% of mica powder, 3% of kaolin, 5% of anti-rust pigment, 6% of aluminum tripolyphosphate were added in sequence at a speed of 400-900 r/min, then the speed was adjusted to 1800-2000 r/min, and the components were dispersed for 45-60 min;
(3) 19% of VAE emulsion, 0.7% of freeze-thaw agent, 1.2% of film-forming aid and 0.3% of thickener were added at a speed of 700-900 r/min.

In the above embodiments: the water is ordinary tap water; the wetting and dispersing agent is Clariant XW330 ammonium salt dispersant; the defoaming agent is BYK-019 silicone defoaming agent; the fire retardant is the self-made composite fire retardant; the titanium dioxide is R818 from Jinan Yuxing; the magnesium hydroxide, mica powder, and kaolin are all industrial-grade powder from Shenzhen Jinhaohui; the anti-rust pigment is SZP-391 imported zinc phosphate from Halox; the aluminum tripolyphosphate is industrial grade aluminum tripolyphosphate from Shijiazhuang Xinsheng Chemical Co.; the VAE emulsion is WACKER 706K vinyl acetate-ethylene copolymer emulsion; the freeze-thaw agent is ethylene glycol from Qilu; the film-forming aid is C-12 from Qilu; and the polyurethane thickener is TEGO3010 from Tego.

According to "Fire-retardant coating for steel structure" GB14907-2018, the intumescent fire-retardant coatings prepared in the above 7 embodiments were tested, and the test results are shown in Table 1. According to "Anticorrosive Coatings for Building Steel Structure" JG/T224-2007, the intumescent fire-retardant coatings prepared in the above 7 embodiments were tested for salt spray resistance, and the test results are shown in Table 2. It can be seen from the test data that the intumescent fire-retardant coating prepared by the present disclosure has excellent fire-retardant performance and ultra-high salt spray resistance.

The above specific embodiments are only detailed explanations of the technical schemes of the present disclosure. The present disclosure is not limited to the above embodiments. All equivalent changes and modifications made according to the scope of the present disclosure and the contents of the specification shall fall within the protection scope of the present disclosure.

TABLE 1

Test results based on "Fire-retardant coatings for steel structures" GB14907-2018

| performance test | Example 1 | Example 2 | Example 3 | Example 4 | Example 5 | Example 6 | Example 7 |
|---|---|---|---|---|---|---|---|
| status in the container | normal | normal | normal | normal | normal | normal | normal |
| initial dry cracking resistance | no cracking | no cracking | no cracking | no cracking | no cracking | no cracking | no cracking |
| bond strength/MPa | 0.81 | 0.81 | 0.79 | 0.79 | 0.78 | 0.79 | 0.79 |
| coating thickness/mm | 3 | 3 | 3 | 3 | 3 | 3 | 3 |
| duration of fire resistance/min | 124 | 139 | 167 | 168 | 173 | 169 | 181 |
| inflation rate | 37 | 52 | 69 | 71 | 65 | 59 | 68 |

TABLE 2

Test results of salt spray resistance based on "Anticorrosive Coatings for Building Steel Structure" JG/T224-2007

| performance test | Example 1 | Example 2 | Example 3 | Example 4 | Example 5 | Example 6 | Example 7 |
|---|---|---|---|---|---|---|---|
| salt spray resistance | no peeling and red rust appear after 600 h | no peeling and red rust appear after 500 h | no peeling and red rust appear after 500 h | no peeling and red rust appear after 600 h | no peeling and red rust appear after 700 h | no peeling and red rust appear after 900 h | no peeling and red rust appear after 1000 h |

What is claimed is:

1. An intumescent fire-retardant coating composition with ultra-high corrosion resistance, comprising:
   13-20 mass % of water;
   0.3-0.6 mass % of wetting and dispersing agent;
   0.2-0.5 mass % of defoaming agent;
   12-20 mass % of composite carbon-forming catalyst;
   6-10 mass % of composite blowing agent;
   6-10 mass % of pentaerythritol;
   3-6 mass % of titanium dioxide;
   4-8 mass % of Mg(OH)$_2$;
   3-6 mass % of mica powder;
   3-7 mass % of kaolin;
   3-7 mass % of anti-rust pigment;
   4-7 mass % of aluminum tripolyphosphate;
   11-21 mass % of vinyl acetate-ethylene (VAE) emulsion;
   0.6-0.8 mass % of freeze-thaw agent;
   1.0-1.8 mass % of film-forming aid; and
   0.2-0.5 mass % of thickener;
   based on the overall mass of the composition;
   wherein the composite carbon-forming catalyst is a mixture of ammonium polyphosphate and calcium phytate, and the mass ratio of the ammonium polyphosphate and calcium phytate is 2:1; and
   wherein the composite blowing agent is a mixture of melamine and chlorinated paraffin, and the mass ratio of melamine and chlorinated paraffin is 2:1.

2. The intumescent fire-retardant coating composition with ultra-high corrosion resistance according to claim 1, wherein,
   the wetting and dispersing agent is an ammonium polycarboxylate salt dispersing agent; the defoaming agent is a silicone defoaming agent; the freeze-thaw agent is ethylene glycol; the film-forming aid is alcohol ester 12; and the thickener is an associative polyurethane thickener.

3. The intumescent fire-retardant coating composition with ultra-high corrosion resistance according to claim 1, wherein, the titanium dioxide is rutile titanium dioxide.

4. The intumescent fire-retardant coating composition with ultra-high corrosion resistance according to claim 1, wherein, the Mg(OH)$_2$ is magnesium hydroxide; the mica powder is sericite; and the kaolin is calcined kaolin.

5. The intumescent fire-retardant coating composition with ultra-high corrosion resistance according to claim 1, wherein, the anti-rust pigment is strontium zinc phosphosilicate.

6. The intumescent fire-retardant coating composition with ultra-high corrosion resistance according to claim 1, wherein, the aluminum tripolyphosphate has a sheet-like structure, and its structural formula is as follows:

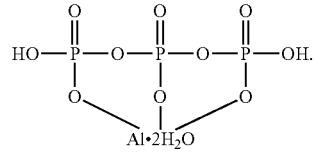

7. The intumescent fire-retardant coating composition with ultra-high corrosion resistance according to claim 1, wherein, the VAE emulsion is a vinyl acetate-ethylene copolymer emulsion.

8. A method for preparing the intumescent fire-retardant coating composition with ultra-high corrosion resistance according to claim 1, comprising the following steps:
   (1) adding relative amounts of said water, wetting and dispersing agent, and defoaming agent to a disperser and stirring at a rotation speed of 300-400 revolutions/minute for 3-5 minutes;
   (2) adding relative amounts of said composite carbon-forming catalyst, composite blowing agent, pentaerythritol, titanium dioxide, Mg(OH)$_2$, mica powder, kaolin, anti-rust pigment, and aluminum tripolyphosphate in sequence at a rotation speed of 400-900 revolutions/minute, adjusting the rotation speed to 1800-2000 revolutions/minute, and dispersing for 45-60 minutes; and
   (3) adding relative amounts of said VAE emulsion, freeze-thaw agent, film-forming aid, and thickener at a rotation speed of 700-900 revolutions/minute;
   wherein steps (1), (2), and (3), and the relative amounts thereof, yield the intumescent fire-retardant coating composition with ultra-high corrosion resistance according to claim 1.

* * * * *